(12) United States Patent
Muller et al.

(10) Patent No.: US 8,053,511 B2
(45) Date of Patent: Nov. 8, 2011

(54) PROCESS FOR PREPARING POLYMER DISPERSIONS, THE RESULTING DISPERSIONS AND THEIR USE

(75) Inventors: Harmin Muller, Hofheim (DE); Harald Petri, Aarbergen (DE); Thomas Drechsel, Steinbach/Ts. (DE)

(73) Assignee: Celanese Emulsions GmbH, Kronberg/TS. (DE)

( * ) Notice: Subject to any disclaimer, the term of this patent is extended or adjusted under 35 U.S.C. 154(b) by 0 days.

(21) Appl. No.: 12/367,039

(22) Filed: Feb. 6, 2009

(65) Prior Publication Data

US 2009/0203832 A1    Aug. 13, 2009

(30) Foreign Application Priority Data

Feb. 9, 2008 (DE) .................. 10 2008 008 421

(51) Int. Cl.
    *C08L 29/04* (2006.01)
    *C08F 2/44* (2006.01)

(52) U.S. Cl. ............... 524/557; 524/556; 524/849

(58) Field of Classification Search ............ 524/556, 524/557, 849
See application file for complete search history.

(56) References Cited

U.S. PATENT DOCUMENTS

2007/0060702 A1* 3/2007 Gao et al. .................. 524/700
2007/0112117 A1* 5/2007 Weitzel ...................... 524/459

FOREIGN PATENT DOCUMENTS

| | | |
|---|---|---|
| DE | 2058773 | 5/1972 |
| DE | 103 35 958 A1 | 2/2005 |
| DE | 10 2005 054 904 A1 | 5/2007 |
| DE | 10 2006 019 184 A1 | 10/2007 |
| DE | 10 2006 020 275 A1 | 10/2007 |
| EP | 0 486 262 A1 | 5/1992 |
| EP | 1 491 558 A1 | 12/2004 |
| GB | 1 322 971 | 7/1973 |
| JP | A-07/082304 | 3/1995 |
| WO | WO A-2004/022609 | 3/2004 |
| WO | WO 2004/096871 A1 | 11/2004 |
| WO | 2004/113392 A1 | 12/2004 |
| WO | WO 2005/000916 A1 | 1/2005 |
| WO | WO 2005/016977 A1 | 2/2005 |

OTHER PUBLICATIONS

"Optimization of Vinyl Acetate Emulsion Polymerization Reactions. Effect of Operational Conditions on Molecular Weight", DECHEMA Monographs, vol. 137, pp. 653-659.
Vdl Guideline Vdl-RL 09 (with English Translation).
European Search Report, dated May 13, 2009.

\* cited by examiner

*Primary Examiner* — Michael M Bernshteyn
(74) *Attorney, Agent, or Firm* — Dority & Manning, P.A.

(57) ABSTRACT

A description is given of a process of emulsion polymerization of free-radically polymerizable ethylenically unsaturated monomers selected from the group of the monoesters or diesters of ethylenically unsaturated monocarboxylic or dicarboxylic acids with alkanols, vinyl esters and/or vinylaromatics and, if desired, further monomers copolymerizable therewith, at least 60% of the total conversion in the polymerization taking place at a temperature of 100° C. to 160° C., the polymerization being performed in the presence of emulsifiers and an amount of 0% to 1% by weight, based on the total amount of the monomers used, of protective colloid.

The process can be used to obtain significantly faster conversions for comparable quality of the process products.

The dispersions obtained can be employed in a wide variety of different applications, such as binders for paints or as adhesives.

19 Claims, No Drawings

PROCESS FOR PREPARING POLYMER DISPERSIONS, THE RESULTING DISPERSIONS AND THEIR USE

The present invention relates to a process for the very rapid preparation of polymer dispersions and to the dispersions prepared therewith. These new dispersions based on selected ethylenically unsaturated monomers are outstandingly suitable for formulating adhesives and paints on an aqueous basis and also for other applications, as for example for the formulation of renders, for use in nonwovens, or for the use of binders for any of a wide variety of substrates.

Dispersion-based adhesives and paints that are based on dispersions are known and are manufactured commercially in high volumes. In the majority of cases such systems are prepared by means of emulsion polymerization. One particular problem, however, is the removal of heat during the exothermic polymerization, although this heterophase mixture typically contains between about 30% and 60% water. The removal of heat is often the limiting factor in performing the polymerization more rapidly.

The polymerization processes are said to ensure high space-time yields and at the same time the maximum possible reliability in terms of the reaction regime. Furthermore, they are intended to form reaction products which are highly reproducible and which have not only a desired average molecular weight but also a desired molecular weight distribution. In the case of free-radical emulsion polymerization, the operation can be controlled via a multiplicity of process parameters. Examples thereof are polymerization temperature, reactant metering rate, removal of heat of reaction, nature and amount of constituents of the reaction system, or design of the polymerization reactor. The proposals in the literature for the performance of these polymerization reactions are correspondingly numerous.

Described in the prior art are a plurality of processes which efficiently remove heat produced in the course of free-radical polymerization.

In Dechema Monographs, Vol. 137, pp. 653-9 (2001), P. H. H. Araújo et al. described the influence of process parameters on the optimization of polymerization reactions of vinyl acetate emulsions. The article is concerned with optimizing batch reactions of this monomer system. Operational variables specified are temperature profiles and also the rates of addition of monomers and initiators, and there is a reference to the influence of the heat removal capacity of the reactor. As a result of the optimization it is possible to achieve significantly shortened cycle times.

JP-A-07/082,304 describes the suspension polymerization of vinyl chloride in a reactor equipped with reflux condenser. To shorten the polymerization time, a highly active, oil-soluble initiator is added to the reaction mixture before 60% of the total conversion is reached.

WO 2005/016,977 A1 discloses a process for preparing aqueous polymer dispersions by means of free-radically initiated emulsion polymerization. This process encompasses the one-stage polymerization of at least one ethylenically unsaturated compound in the presence of at least one dispersant and of at least one water-soluble and one oil-soluble free-radical initiator. The process commences at a starting reaction temperature which over the course of the process increases to a final reaction temperature. The one-stage process described allows the production of aqueous polymer dispersions having a low residual monomer content, without the use of additional reducing agents.

EP 1 491 558 A1 describes a process for monitoring the structure of a copolymer which is derived from at least one relatively slow-reacting and one relatively quick-reacting comonomer. The process encompasses the implementation of tests for determining the rates of reaction of the two monomers, and the implementation of the copolymerization itself, the addition of the quicker-reacting monomer being controlled as a function of the data obtained from the test polymerization.

EP 0 486 262 A1 describes a process for preparing copolymer dispersions by controlled addition of the reactants. The reaction is controlled by adapting the rate of addition of the reactants and/or the polymerization temperature, the regulation taking place by observation of the heat of reaction released and its compensation by the known energy balance of the reaction system.

WO 2004/096,871 A1 describes the improvement to a process of emulsion polymerization through the use of a system of two initiators. The less stable initiator is metered in after the start of the polymerization, at a rate such that the system has to be operated with maximum cooling capacity at the beginning of reaction. The process permits high space-time yields without the reaction running out of control.

WO 2004/113,392 A1 discloses a further process of free-radical polymerization, using a peroxide which at the polymerization temperature has a half-life of up to an hour. The initiator is metered in at a rate such that the system has to be operated with maximum cooling capacity, and the reaction temperature obtained is monitored and is held at a predetermined level by means of the rate of addition of the initiator. The process allows polymers to be produced with highly reproducible K values. The process is described for the polymerization of vinyl chloride and further comonomers where appropriate.

WO 2005/000,916 A1 describes a process of aqueous emulsion polymerization using a combination of organic peroxide and a stabilizer therefor. At least part of the organic peroxide is added to the reaction mixture when the polymerization temperature is reached. The process allows polymers to be produced which have a relatively uniform molecular weight.

DE 10 2005 054 904 A1 describes a process for preparing polyvinyl alcohol-stabilized lattices. The process is performed as an emulsion polymerization and includes the characteristic feature that at least 60% of the total conversion takes place at temperatures between 100 and 140° C. According to the description, the amount of polyvinyl alcohol present during the polymerization is 1% to 20% by weight, based on the total monomer weight. In comparison to conventional processes of emulsion polymerization, which proceed typically at temperatures of around 70° C., the reaction temperatures used here are high. With this process, therefore, it is absolutely necessary to carry out polymerization in the presence of relatively large amounts of polyvinyl alcohol. Under these polymerization conditions, however, it is common to observe a build-up of increased viscosities, and this, in the case of subsequent processing or application, may be disruptive.

Disadvantages affecting the above-described processes with high reaction temperatures are the impairment of product properties, such as the reduction of the molecular weight in the case of polymers, and the impairment of other performance properties, such as the abrasion resistance in the case of paints or the heat stability in the case of adhesives, for example.

The main problem here is always that, on the one hand, the measures for heat removal must be commercially rational, and, on the other hand, the properties must as far as possible be retained in comparison to products which have been prepared at lower temperatures.

On the basis of this prior art the problem addressed by the present invention was that of providing an emulsion polymerization process which allows, within a very short time and with utilization of the heat reaction produced, the preparation of vinyl ester polymer dispersions which at the same time possess outstanding product properties, such as a comparatively low viscosity, for example.

Through the use of the process of the invention it is possible for example to reduce reaction times by more than 50% without detriment to the performance properties of the resultant products.

The present invention provides a process of emulsion polymerization of free-radically polymerizable ethylenically unsaturated monomers selected from the group of the monoesters or diesters of ethylenically unsaturated monocarboxylic or dicarboxylic acids with alkanols, vinyl esters and/or vinylaromatics and, if desired, further monomers copolymerizable therewith, at least 60% of the total conversion in the polymerization taking place at a temperature of 100° C. to 160° C., which comprises performing the emulsion polymerization in the presence of emulsifiers and an amount of 0% to 1% by weight, based on the total amount of the monomers used, of protective colloid.

Surprisingly, in the process of the invention, as in the case of the process known from DE 10 2005 054 904 A1, polymers are obtained which possess the same or only slightly lower molecular weights but nevertheless lead to full performance properties. It is not the case, as with other processes of emulsion polymerization at elevated temperatures, an example being the process known from DE 103 35 958 A1, that a particular initiator regime and initiator type is required; instead, it is possible to operate in a known way.

In particular it is possible to use the customary water-soluble initiators, since oil-soluble initiators are usually not very efficient in emulsion polymerization, owing to their poor transport via the water phase, and in some cases also lead to suspension polymerization, with the formation of large particles, which for certain applications is undesirable. The great advantage, then, is that the process of the invention permits significantly more economic preparation of the desired products, without detractions from their quality or performance, and the process of the invention is also possible on the commercial scale.

The preparation of the homopolymers and copolymers takes place by the emulsion polymerization process, the starting polymerization temperature being generally, but not necessarily, less than 100° C. At least 60% of the total conversion in the polymerization, preferably at least 70%, more preferably at least 80%, takes place at temperatures of 100° C. to 160° C., preferably at 100 to 140 and very preferably at 100 to 120° C.

The process of the invention is carried out at higher temperatures than in the case of conventional processes of emulsion polymerization. For reasons of the apparatus expenditure involved, a temperature of more than 160° C. does not appear to be rational, although it would also be possible to operate at higher temperatures.

At temperatures below 100° C., on the other hand, the operating time for the polymerization step is prolonged considerably, and so this temperature range is less suitable for reasons of operational economics. At these temperatures, moreover, significantly lower molecular weights are produced again, and there are fewer graft reactions, leading to poorer performance properties.

The cooling capacity K required can be determined by the equations (1) and (2) as described in DE 10 2005 054 904 A1, in other words from $$K = \Delta T * Ü * W \quad (1)$$

and from $$\Delta T = T_r - T_k \quad (2),$$

where
Ü is the heat transfer coefficient,
W is a constant which includes the heat capacities,
$T_k$ is the cooling water temperature, and
$T_r$ is the reactor temperature.

The process of the invention otherwise corresponds essentially to the process known from DE 10 2005 054 904 A1, with the key modification that it is possible to operate with emulsifier-stabilized polymerization systems or with hybrid systems which comprise emulsifiers and small amounts of protective colloid, such as polyvinyl alcohol, and that, where appropriate, it is even possible to operate at temperatures higher than those specified in said document. This means that the grafting of polyvinyl alcohol has little or no part to play.

In preferred embodiments of the process of the invention the emulsion polymerization is carried out in the presence of an amount of 0.05% to 1% by weight, based on the total amount of the monomers used, of protective colloid, or alternatively in the absence of protective colloid.

In another preferred embodiment of the process of the invention at least 60%, especially at least 70%, of the total conversion in the polymerization takes place at a temperature of 100° C. to 140° C., preferably of 100 to 120° C.

The free-radical emulsion polymerization can be performed in a manner known per se in a batch process, in a feed process, in a combined batch/feed process or in a continuous process, such as, for example, loop or cascade reactor with a plurality of reactors connected one behind another.

It is preferred to operate in a combined batch/feed process or, with particular preference in a feed process, in which case usually a portion of the monomers employed, 1% to 50%, for example, preferably 5%-30%, by weight, are introduced as an initial charge in order to start the polymerization. The monomers may be metered either together or in separate feed streams. Furthermore, it may be advantageous, in certain embodiments, to set specific particle sizes and particle size distributions at the beginning of the polymerization, to carry out a seed polymerization or to include a separately prepared seed in the initial charge.

The emulsifier used for stabilization and/or the protective colloid, where used, can either be introduced completely at the beginning of the polymerization, in the initial charge, or else part may be included in the initial charge and part metered in, or the entire amount metered in during the performance of the polymerization. It is preferred to include the entire emulsifier or a large part of the emulsifier in the initial charge.

A feature of the process of the invention in comparison to conventional processes of emulsion polymerization are significantly reduced polymerization times. An emulsion polymerization divides down into a heating phase and starting phase, into a polymerization phase, into a post polymerization phase, and into a cooling phase, in which additionally, where appropriate, a redox treatment is undertaken. The durations of heating phase and starting phase, and also of the cooling phase, are dependent on the reactors used in the specific case, as for example on the type, nature, and size of the reactor. The polymerization phase in the context of this description is understood to be the phase which commences with the beginning of monomer conversion, recognizable from the onset of a change in heat in the polymerization, and which ends with the attainment of 95% of the monomer conversion. In the post polymerization phase (which lasts typically between 30 and 60 minutes) the predominant part of the remaining 5% of the monomers are converted; this may take place at a temperature the same as or higher than the temperature of the polymerization phase. Subsequently, during or after the cooling phase, there is usually removal of the residual monomers. This may take place in the same reactor or in a different reactor. The great advantage of the process of the invention over conventional polymerization processes is to be seen in a drastic shortening of the polymerization phase. The duration of the polymerization phase is typically less than 2 hours, in particular less than 1.5 hours, and with very particular preference less than 1 hour.

In the case of the polymerization process of the invention it is possible for part of the monomers to be included in the initial charge prior to the polymerization, and for the remainder to be metered in over the course of the polymerization. Alternatively it is also possible for the entire monomer amount to be metered in over the course of the polymerization.

In one particularly preferred embodiment of the process of the invention up to 50%, preferably 5% to 30%, by weight of the total amount of monomer is included in the initial charge before the beginning of the emulsion polymerization, and the remainder of the monomers is metered into the reaction mixture during the polymerization phase. As well as the monomer, the initial charge may where appropriate also comprise a seed latex.

In the process of the invention the monomers defined above can be used individually or in the form of any desired combinations of the above-defined monomers, provided they are copolymerizable with one another. As well as homopolymers it is possible to produce copolymers. The latter may have a homogeneous or heterogeneous particle morphology, by virtue, for example, of opening the ethylene valve only after a certain conversion has been reached, 10%-60%, for example, and so producing a pressure stage which leads to a heterogeneous particle morphology. Other monomer profiles as well, however, can be utilized, and are known to the person skilled in the art, for the purpose of generating heterogeneous particle morphologies.

It is possible to use monomer mixtures or with preference it is possible to use different monomers or monomer mixtures in separate feeds. In one preferred embodiment, copolymers with a heterogeneous morphology are produced by polymerizing a first monomer or first mixture of monomers to form a first polymer and thereafter polymerizing a second monomer or second mixture of monomers onto the first polymer.

It is preferred to combine "hard" and "soft" monomers with one another. Hard monomers in the context of this description are monomers whose homopolymers have a glass transition temperature (DSC) of more than 25° C. Soft monomers in the context of this description are monomers whose homopolymers have a glass transition temperature (DSC) of less than or equal to 25° C. Particular preference is given to polymerizing first monomers which are composed of hard monomers, or contain a hard monomer fraction of more than 50% by weight, based on the total fraction of the first monomers, followed by a polymerization of second monomers onto the resultant polymer, said monomers being composed of soft monomers or including a fraction of more than 50% by weight of soft monomers, based on the total fraction of the second monomers.

The emulsion polymerization of the invention is preferably performed at least partly under pressure. Typical operating pressures are situated in the range from 0.1 to 120 bar overpressure, more particularly in the range from 1 to 80 bar overpressure, and very preferably in the range from 10 to 80 bar overpressure.

Particularly when working with gaseous monomers, such as ethylene, these monomers are added under pressure.

Where a pressure stage is operated in the process of the invention, in one variant the metering of the gaseous monomer is commenced only after 10%-50% by weight of the liquid monomers in the reaction mixture have been converted, thus forming heterogeneous particle morphologies.

Where the process of the invention is operated with a pressure stage, in another version the metering of the gaseous monomer is commenced at the beginning of the emulsion polymerization, and so conversion takes place together with the liquid monomers, forming homogeneous particle morphologies.

Where a seed latex is used in the process of the invention, it is used before the beginning of the emulsion polymerization and accounts for an amount which is preferably 1%-20%, more particularly 1%-10%, by weight of the resulting dispersion.

The emulsion polymers produced by the process of the invention are constructed substantially on the basis of one or more ethylenically unsaturated compounds; they are preferably polymers derived from esters of ethylenically unsaturated monocarboxylic or dicarboxylic acids and/or from vinyl esters and/or from alkenyl aromatics.

In principle the following groups of principal monomers are contemplated as a basis for the stated classes of polymer:

One group is formed by vinyl esters of monocarboxylic acids containing one to eighteen carbon atoms, examples being vinyl formate, vinyl acetate, vinyl propionate, vinyl isobutyrate, vinyl valerate, vinyl pivalate, vinyl 2-ethylhexanoate, vinyl decanoate, isopropenyl acetate, vinyl esters of saturated branched monocarboxylic acids having 5 to 15 carbon atoms in the acid radical, especially vinyl esters of Versatic™ acids, vinyl esters of relatively long-chain saturated or unsaturated fatty acids such as vinyl laurate, vinyl stearate, for example, and also vinyl esters of benzoic acid and of substituted derivatives of benzoic acid, such as vinyl p-tert-butylbenzoate. Of these, however, vinyl acetate is particularly preferred as principal monomer.

Another group of principal monomers which can be used as well as the vinyl esters and/or esters of ethylenically unsaturated monocarboxylic or dicarboxylic acids and/or alkenyl aromatics is formed by aliphatic, monoolefinically or diolefinically unsaturated, optionally halogen-substituted hydrocarbons, such as ethene, propene, 1-butene, 2-butene, isobutene, conjugated $C_4$-$C_8$ dienes, such as 1,3-butadiene, isoprene, chloroprene, vinyl chloride, vinylidene chloride, vinyl fluoride or vinylidene fluoride.

A further group of principal monomers is formed by esters of ethylenically unsaturated monocarboxylic or dicarboxylic acids, preferably esters of α,β-ethylenically unsaturated $C_3$-$C_8$ monocarboxylic or dicarboxylic acids, with preferably $C_1$-$C_{18}$ alkanols and more particularly with $C_1$-$C_8$ alkanols or with $C_5$-$C_8$ cycloalkanols. The esters of the dicarboxylic acids may be monoesters or, preferably, diesters. Examples of suitable $C_1$-$C_8$ alkanols are methanol, ethanol, n-propanol, isopropanol, 1-butanol, 2-butanol, isobutanol, tert-butanol, n-hexanol, and 2-ethylhexanol. Examples of suitable cycloalkanols are cyclopentanol or cyclohexanol. Examples are esters of acrylic acid, of methacrylic acid, of crotonic acid, of maleic acid, of itaconic acid, of citraconic acid or of fumaric acid, such as methyl (meth)acrylate, ethyl (meth)acrylate, isopropyl (meth)acrylate, n-butyl (meth)acrylate, isobutyl (meth)acrylate, 1-hexyl (meth)acrylate, tert-butyl (meth)

acrylate, 2-ethylhexyl (meth)acrylate, di-n-methyl maleate or fumarate, di-n-ethyl maleate or fumarate, di-n-propyl maleate or fumarate, di-n-butyl maleate or fumarate, diisobutyl maleate or fumarate, di-n-pentyl maleate or fumarate, di-n-hexyl maleate or fumarate, dicyclohexyl maleate or fumarate, di-n-heptyl maleate or fumarate, di-n-octyl maleate or fumarate, di(2-ethylhexyl) maleate or fumarate, di-n-nonyl maleate or fumarate, di-n-decyl maleate or fumarate, di-n-undecyl maleate or fumarate, dilauryl maleate or fumarate, dimyristyl maleate or fumarate, dipalmitoyl maleate or fumarate, distearyl maleate or fumarate, and diphenyl maleate or fumarate.

A further group of principal monomers is formed by the alkenyl aromatics. These are monoalkenyl aromatics. Examples thereof are styrene, vinyltoluene, vinylxylene, α-methylstyrene or o-chlorostyrene.

The stated monomers generally form the principal monomers, which, in relation to the total amount of monomers to be polymerized by the process of free-radical aqueous polymerization, normally account for a fraction of more than 50% by weight, preferably more than 75%.

Preferred principal monomers are constructed on the basis of the following polymer classes:

Homopolymers or copolymers of one or more vinyl esters, more particularly of vinyl acetate; copolymers of vinyl esters with esters of α,β-ethylenically unsaturated $C_3$-$C_8$ monocarboxylic or dicarboxylic acids with $C_1$-$C_8$ alkanols, especially esters of (meth)acrylic acid and maleic/or fumaric acid; copolymers of vinyl esters, especially vinyl acetate, with ethene; terpolymers of vinyl esters, ethene, and esters of α,β-ethylenically unsaturated $C_3$-$C_8$ monocarboxylic or dicarboxylic acids with $C_1$-$C_8$ alkanols, especially esters of (meth)acrylic acid and maleic/or fumaric acid; homopolymers or copolymers of esters of (meth)acrylic acid; copolymers of styrene with butadiene and/or esters of α,β-ethylenically unsaturated $C_3$-$C_8$ monocarboxylic or dicarboxylic acids with $C_1$-$C_8$ alkanols, especially esters of (meth)acrylic acid.

Particular preference is given to preparing polyvinyl esters by the process of the invention; these are homopolymers or copolymers which derive from vinyl esters as principal monomers. Of these, very particular preference is given to the vinyl ester-ethylene copolymers, which where appropriate may also have structural units derived from monomers copolymerizable therewith.

The monomers used in the process of the invention are to be selected such as to produce a polymer or copolymer having the properties that are needed for the desired end application. This can be done by setting the glass transition temperature of the polymers formed and the corresponding copolymerization parameters in a manner which is known per se.

It is of course possible to use further comonomers, which modify the properties in a specific way, in the polymerization as well. Such auxiliary monomers are normally copolymerized only as modifying monomers, in amounts, based on the total amount of the monomers to be polymerized, of less than 50% by weight, generally of less than 20% and preferably of less than 10% by weight.

These monomers serve for further stabilization of the dispersion, may improve the film cohesion or other properties by crosslinking during the polymerization or during film formation and/or, by virtue of a suitable functionality, may react with another component present in the dispersion, the reaction being accompanied by crosslinking.

Monomers which may serve for further stabilization are, in general, monomers which have an acid function and/or salts thereof. This group includes, for example, α,β-monoethylenically unsaturated monocarboxylic and dicarboxylic acids having 3 to 10 C atoms, ethylenically unsaturated sulfonic acids, ethylenically unsaturated phosphonic acids or dihydrogen phosphates, and water-soluble salts thereof, such as their sodium salts, for example. Preferred monomers from this group are vinyl sulfonic acid and its alkali metal salts, acrylamidopropanesulfonic acid and its alkali metal salts, ethylenically unsaturated $C_3$-$C_8$ carboxylic acids and $C_4$-$C_8$ dicarboxylic acids, e.g., itaconic acid, crotonic acid, vinylacetic acid, acrylamidoglycolic acid, and, in particular, acrylic acid and methacrylic acid.

Examples of crosslinking auxiliary monomers are monomers containing two or more vinyl radicals, monomers containing two or more vinylidene radicals, and monomers containing two or more alkenyl radicals. Particularly advantageous in this context are the diesters of dihydric alcohols with α,β-monoethylenically unsaturated monocarboxylic acids, among which acrylic and methacrylic acid are preferred; the diesters of dibasic carboxylic acids with ethylenically unsaturated alcohols; other hydrocarbons having two ethylenically unsaturated groups; or the diamides of difunctional amines with α,β-monoethylenically unsaturated monocarboxylic acids.

Examples of monomers of this kind containing two non-conjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates or dimethacrylates, and ethylene glycol diacrylates or dimethacrylates, 1,2-propylene glycol dimethacrylate, 1,3-propylene glycol dimethacrylate, 1,3-butylene glycol dimethacrylate, 1,4-butylene glycol dimethacrylates, hexanediol diacrylate, pentaerythritol diacrylate, and also divinylbenzene, vinyl methacrylate, vinyl acrylate, vinyl crotonate, allyl methacrylate, allyl acrylate, diallyl maleate, diallyl fumarate, diallyl phthalate, methylenebisacrylamide, cyclopentadienyl acrylate, divinyl adipate or methylenebisacrylamide.

It is, however, also possible to use monomers having more than two double bonds, examples being tetraallyloxyethane, trimethylolpropane triacrylate or triallyl cyanurate.

A further group of auxiliary monomers is suitable for reacting, with crosslinking, under selected conditions, either by self-crosslinking or with a suitable monomeric reaction partner present in the dispersion, a polyaldehyde, for example.

This group includes monomers having N-functional groups, including, more particularly, (meth)acrylamide, allyl carbamate, acrylonitrile, methacrylonitrile, N-methylol (meth)acrylamide, N-methylolallyl carbamate and also the N-methylol esters, N-methylol alkyl ethers or Mannich bases of N-methylol(meth)acrylamide or N-methylolallyl carbamate, acrylamidoglycolic acid, methyl acrylamidomethoxy acetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)acrylamide, N-(3-hydroxy-2,2-dimethylpropyl)methacrylamide, ethylimidazolidone (meth)acrylate, N-(meth)acryloyloxy-ethylimidazolidin-1-one, N-(2-methacrylamidoethyl)imidazolin-2-one, N-[(3-allyloxy-2-hydroxypropyl)aminoethyl] imidazolin-2-one, N-vinylformamide, N-vinylpyrrolidone or N-vinylethyleneurea.

Another group of auxiliary monomers is formed by hydroxy-functional monomers such as the $C_1$-$C_9$ hydroxyalkyl esters of acrylic and methacrylic acid, such as n-hydroxyethyl, n-hydroxypropyl or n-hydroxybutyl acrylate and methacrylate, and also their adducts with ethylene oxide or propylene oxide.

Another group of auxiliary monomers is formed by those which are self-crosslinking or crosslinkable via carbonyl groups. Examples are diacetoneacrylamide, allyl acetoacetate, vinyl acetoacetate, and also acetoacetoxyethyl acrylate or methacrylate.

Another group of auxiliary monomers is composed of ethylenically unsaturated monomers comprising silane groups, examples being vinyltrialkoxysilanes, such as vinyltrimethoxysilane, vinyltriethoxysilane, alkylvinyldialkoxysilanes or (meth)acryloyloxyalkyltrialkoxysilanes, e.g., (meth)acryloyloxyethyltrimethoxysilane, or (meth)acryloyloxypropyltrimethoxysilane.

Another group of auxiliary monomers is composed of ethylenically unsaturated monomers containing epoxy groups, such as, for example, allyl glycidyl ether, methacryloyl glycidyl ether, butadiene monoepoxides, 1,2-epoxy-5-hexene, 1,2-epoxy-7-octene, 1,2-epoxy-9-decene, 8-hydroxy-6,7-epoxy-1-octene, 8-acetoxy-6,7-epoxy-1-octene, N-(2,3-epoxypropyl)acrylamide, N-(2,3-epoxypropyl)methacrylamide, 4-acrylamidophenyl glycidyl ether, 3-acrylamidophenyl glycidyl ether, 4-methacrylamidophenyl glycidyl ether, 3-methacrylamidophenyl glycidyl ether, N-glycidyloxymethylacrylamide, N-glycidyloxypropylmethacrylamide, N-glycidyloxyethylacrylamide, N-glycidyloxyethylmethacrylamide, N-glycidyloxypropylacrylamide, N-glycidyloxypropylmethacrylamide, N-glycidyloxybutylacrylamide, N-glycidyloxybutylmethacrylamide, 4-acrylamidomethyl-2,5-dimethylphenyl glycidyl ether, 4-methacrylamidomethyl-2,5-dimethylphenyl glycidyl ether, acrylamidopropyldimethyl(2,3-epoxypropyl)ammonium chloride, methacrylamidopropyldimethyl(2,3-epoxypropyl) ammonium chloride, and glycidyl methacrylate.

The process of the invention is used with very particular preference to prepare copolymers of vinyl esters, more particularly vinyl acetate, with ethene and ethylenically unsaturated epoxide compounds, more particularly glycidyl acrylate or glycidyl methacrylate, and also to prepare copolymers of vinyl esters, more particularly vinyl acetate, with ethene and ethylenically unsaturated silane compounds, more particularly trialkoxysilylpropyl acrylate or methacrylate (or vinyltrialkoxysilanes). Further preferred copolymers may where appropriate comprise, in addition to the abovementioned structural units, further structural units derived from acrylic esters or from methacrylic esters, such as from butyl acrylate and/or from 2-ethylhexyl acrylate.

Preference is given to preparing vinyl acetate homopolymers, copolymers of vinyl acetate with one or more further vinyl esters, such as with vinyl esters having 1 to 12 carbon atoms in the carboxylic acid radical, e.g., vinyl propionate, vinyl laurate, vinyl esters of α-branched carboxylic acids having 9 to 11 carbon atoms, such as VeoVa9, VeoVa10, VeoVa11 from Resolution Europe BV, Hoogvliet, Netherlands; copolymers of vinyl acetate with one or more further vinyl esters and with one or more acrylic esters and/or methacrylic esters, copolymers of vinyl acetate with 1% to 70% by weight of ethylene, more preferably 5% to 40% by weight of ethylene; copolymers of vinyl acetate with 1% to 40% by weight of ethylene and 1% to 50% by weight of one or more further comonomers from the group of vinyl esters having 1 to 12 carbon atoms in the carboxylic acid radical, such as vinyl propionate, vinyl laurate, vinyl esters of α-branched carboxylic acids having 9 to 11 carbon atoms, such as VeoVa9, VeoVa10, VeoVa11 from Resolution Europe BV, Hoogvliet, Netherlands; copolymers of vinyl acetate, 1% to 40% by weight of ethylene, and, preferably, 1% to 60% by weight of (meth)acrylic esters of unbranched or branched alcohols having 1 to 15 carbon atoms, more particularly n-butyl acrylate or 2-ethylhexyl acrylate; and copolymers with 30% to 75% by weight of vinyl acetate, 1% to 30% by weight of vinyl laurate or vinyl esters of an α-branched carboxylic acid having 9 to 11 carbon atoms, and also 1% to 30% by weight of (meth)acrylic esters of unbranched or branched alcohols having 1 to 15 carbon atoms, more particularly n-butyl acrylate or 2-ethylhexyl acrylate, which also contain 1% to 40% by weight of ethylene; copolymers with vinyl acetate, 1% to 40% by weight of ethylene, and 1% to 60% by weight of vinyl chloride; the polymers may also contain the stated auxiliary monomers in the stated amounts, preferably ethylenically unsaturated epoxide compounds and/or ethylenically unsaturated silane compounds, and the amounts in % by weight add up to 100% by weight in each case.

The monomer selection, and the selection of the weight fractions of the comonomers, are preferably made so as to result in general in a glass transition temperature $T_g$ of $-70°$ C. to $+110°$ C., preferably $-50°$ C. to $+70°$ C., especially of $-30°$ C. to $+40°$ C. The glass transition temperature $T_g$ of the polymers can be determined in a known way by means of differential scanning calorimetry (DSC). The $T_g$ may also be calculated approximately in advance by means of the Fox equation, in a conventional manner.

The process of the invention is carried out in the presence of emulsifiers and, if desired, in the presence of small amounts of protective colloids. The nature and amount of the stabilizers in each individual case are to be selected so as to ensure the required stability of the dispersion and to meet the application-specific tests required. The person skilled in the art is aware of the selection criteria for these purposes.

Emulsifiers and, where used, protective colloids are present during the polymerization. Alternatively they may also be added after the polymerization.

Emulsifiers used are generally nonionic emulsifiers, ionic emulsifiers or combinations of nonionic with ionic emulsifiers, preferably with anionic emulsifiers.

Examples of nonionic emulsifiers are acyl, alkyl, oleyl, and alkylaryl oxyethylates. These products are available commercially, for example, under the name Genapol®, Emulsogen® or Lutensol®. They include, for example, ethoxylated mono-, di-, and tri-alkylphenols (EO degree: 3 to 80, alkyl substituent radical: $C_4$ to $C_{12}$) and also ethoxylated fatty alcohols (EO degree: 3 to 80; alkyl radical: $C_8$ to $C_{36}$), especially $C_{12}$-$C_{14}$ fatty alcohol (3-80)ethoxylates, $C_{13}C_{15}$ oxo-process alcohol (3-80)-ethoxylates, $C_{16}C_{18}$ fatty alcohol (11-80)ethoxylates, $C_{10}$ oxo-process alcohol (3-80)ethoxylates, $C_{13}$ oxo-process alcohol (3-80)ethoxylates, polyoxyethylenesorbitan monooleate with 20 ethylene oxide groups, copolymers of ethylene oxide and propylene oxide with a minimum ethylene oxide content of 10% by weight, the polyethylene oxide (4-80) ethers of oleyl alcohol, and the polyethene oxide (4-80) ethers of nonylphenol. Especially suitable are the polyethylene oxide (4-80) ethers of fatty alcohols, more particularly of oleyl alcohol. Mixtures of nonionic emulsifiers can also be used.

Instead of or in addition to nonionic emulsifiers it is possible to use ionic emulsifiers, preferably anionic emulsifiers. Examples include sodium, potassium, and ammonium salts of straight-chain aliphatic carboxylic acids of chain length $C_{12}$-$C_{20}$, sodium hydroxyoctadecanesulfonate, sodium, potassium, and ammonium salts of hydroxy-fatty acids of chain length $C_{12}$-$C_{20}$ and their sulfonation and/or acetylation products, alkyl sulfates, also in the form of triethanolamine salts, alkyl($C_{10}$-$C_{20}$)-sulfonates, alkyl($C_{10}$-$C_{20}$)-arylsulfonates, dimethyldialkyl($C_8$-$C_{18}$)-ammonium chloride, and their sulfonation products, alkali metal salts of sulfosuccinic esters with aliphatic saturated monohydric alcohols of chain length $C_4$-$C_{16}$, 4-sulfosuccinic esters with polyethylene glycol ethers of monohydric aliphatic alcohols of chain length $C_{10}$-$C_{12}$ (di-sodium salt), 4-sulfosuccinic esters with polyethylene glycol nonylphenyl ether (di-sodium salt), sulfosuccinic acid biscyclohexyl ester (sodium salt), lignosulfonic acid and its calcium, magnesium, sodium, and ammonium salts, resin acids, hydrogenated and dehydrogenated resin acids, and also their alkali metal salts, dodecylated sodium diphenyl ether disulfonate, and also sodium lauryl sulfate, or ethoxylated sodium lauryl ether sulfate (EO degree 3-80), or sodium dodecylbenzene sulfonate. Mixtures of ionic emulsifiers can also be used.

The amount of emulsifiers, based on the total amount of monomers employed, is typically up to 10%, preferably 0.1% to 6.0%, more preferably 0.5% to 5.0%, and very preferably 1.0% to 4.0% by weight.

Suitability for use as a protective colloid, in other words a polymeric stabilizer, is possessed by all of the compounds suitable for this purpose that are known to the person skilled in the art. Examples thereof are polyvinyl alcohols; polyvinyl acetals; polyvinylpyrrolidones; polysaccharides in water-soluble form, such as starches (amylose and amylopectin), modified starches, celluloses and their carboxymethyl, methyl, hydroxyethyl, and hydroxypropyl derivatives; proteins, such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids, and water-soluble copolymers thereof; melamine-formaldehyde sulfonates, naphthalene-formaldehyde sulfonates, styrene-maleic acid copolymers and vinyl ether-maleic acid copolymers, or polyurethane stabilizers. A comprehensive description of further suitable protective colloids is found in Houben-Weyl, Methoden der organischen Chemie, Volume XIV/1, Makromolekulare Stoffe, Georg-Thieme-Verlag, Stuttgart, 1961, pages 411 to 420.

The preferred protective colloid is polyvinyl alcohol. Suitable polyvinyl alcohol possesses degrees of hydrolysis of 60 to 100 mol %, preferably 70 to 99 mol %, and viscosities of the 4% strength aqueous solutions at 20° C. of 2-70 mPa*s, more particularly 30 to 60 mPa*s. Besides "homopolymeric" polyvinyl alcohol, i.e., polyvinyl alcohol composed only of vinyl alcohol groups and residual vinyl acetate groups, it is possible to use copolymeric and/or functionalized polyvinyl alcohols, examples being reaction products of polyvinyl alcohol with diketene or with types of polyvinyl alcohols that carry carboxyl groups, thiol groups, formamido groups, amino groups, arylamino groups, sulfate groups, sulfonate groups, phosphonate groups, quaternary ammonium groups, and other functional groups, such as partially acetalized polyvinyl alcohols.

The stated protective colloids may of course also be used in the form of mixtures.

Where protective colloids are used, their amount, based on the total amount of the monomers employed, is not more than up to 1.0% by weight, preferably up to 0.8% by weight, and more preferably up to 0.6% by weight. The process is, however, also outstandingly suitable without the use of the protective colloids.

The emulsifier used for stabilization and, where appropriate, the protective colloid may alternatively be introduced completely at the beginning of the polymerization, or included partly in the initial charge and partly metered in, or metered in completely during the implementation of the polymerization. The metering of the emulsifier may take place separately or together with at least one monomer in the form of a monomer emulsion. Preferably the entire emulsifier or a large part thereof is included in the initial charge.

To initiate the polymerization it is possible to use the conventional initiators of free-radical polymerizations. Examples of such are hydrogen peroxide, benzoyl peroxide, cyclohexanone peroxide, isopropylcumyl hydroperoxide, persulfates of potassium, of sodium, and of ammonium, peroxides of even-numbered saturated monobasic aliphatic carboxylic acids of chain length $C_8$-$C_{12}$, tert-butyl hydroperoxide, di-tert-butyl peroxide, diisopropyl percarbonate, acetyl cyclohexanesulfonyl peroxide, tert-butyl perbenzoate, tert-butyl peroctoate, bis(3,5,5-trimethylhexanoyl) peroxide, tert-butyl perpivalate, hydroperoxypinane, p-methane hydroperoxide, or azo initiators, such as azoisobutyrodinitrile or 2,2'-azobis(2-methylpropionamidino) dihydrochloride. The aforementioned compounds may also be used within a redox system, in which case transition metal salts, such as iron (II)/(III) salts, or other reducing agents are used as well. Reducing agents or regulators which can be used include alkali metal salts of oxymethanesulfinic acid, such as sodium formaldehyde-sulfoxylate dihydrate (Rongalit® C) or the technical mixture of 2-hydroxy-2-sulfinateacetic acid disodium salt, 2-hydroxy-2-sulfonateacetic acid disodium salt, and sodium sulfite (Brüggolit® FF6 and Brüggolit® FF7), mercaptans of chain length $C_{10}$-$C_{14}$, but-1-ene-3-ol, hydroxylamine salts, sodium dialkyl dithiocarbamate, sodium bisulfite, ammonium bisulfite, sodium dithionite, diisopropylxanthogen disulfide, ascorbic acid, tartaric acid, isoascorbic acid, boric acid, urea, and formic acid.

It is preferred, however, to use water-soluble oxidizing agents, such as persulfates, especially ammonium persulfate or sodium persulfate, such as hydrogen peroxide and/or such as tert-butyl hydroperoxide, or water-soluble reducing agents, such as Rongalit® C, Brüggolit® FF6, Brüggolit® FF7 and/or sodium metabisulfite, or redox systems such as tert-butyl hydroperoxide with Rongalit® C or Brüggolit® FF6 and/or Brüggolit® FF7 and/or sodium metabisulfite with hydrogen peroxide to initiate the polymerization.

The initiator used in the emulsion polymerization may alternatively be added all to the reaction batch at the beginning, or added partially and partially metered in during the course of the polymerization, or metered in completely during the implementation of the polymerization. It is preferred to include one part in the initial charge at the start and to meter in another part.

To control the molecular weight it is possible to use regulating substances during the polymerization. If regulators are used, they are used typically in amounts between 0.01% to 5.0% by weight, based on the monomers employed, and are metered in separately or else in the form of a premix with reaction components. Examples of such substances are alkyl mercaptans, such as n-dodecyl mercaptan, tert-dodecyl mercaptan, or mercaptocarboxylic acids or their esters, such as mercaptopropionic acid, methyl mercaptopropionate, and also alcohols or aldehydes, such as isopropanol and acetaldehyde.

Residual monomer can be removed following the end of the polymerization, employing known methods, by postpolymerization, generally by means of postpolymerization initiated using redox systems. Volatile residual monomers may also be removed by means of distillation, preferably under reduced pressure, and, where appropriate, with inert entraining gases such as air, nitrogen or steam passed through or over the product. Methods of removing residual monomers are known from WO-A-04/22609, for example.

The polyvinyl ester dispersions prepared in accordance with the invention typically possess solids contents of 20% to 70%, preferably 30% to 65%, and more preferably 40% to 60%, by weight.

The pH of the polyvinyl ester dispersions prepared in accordance with the invention is typically between 2 and 8, preferably between 4 and 7.

The average particle size is typically less than 1.2 µm, preferably less than 1000 nm, and more preferably less than 600 nm (measured by means of dynamic light scattering (Contin fit and dw as average diameter) or by means of light scattering (Mastersizer Micro Plus, polydisperse Mie evaluation, dw as average diameter)).

The viscosity of the polyvinyl ester dispersions prepared in accordance with the invention is typically between 100 mPas and 50 000 mPas, preferably between 100 mPas and 20000 mPas, and more preferably between 100 and 15000 mPas (measured by means of Brookfield viscometer at 23° C., 20 rpm, and the corresponding spindle for the correct measuring range).

The polyvinyl ester dispersions prepared in accordance with the invention are likewise provided by the invention.

The dispersions of the invention may comprise further typical additives which are commonly used in adhesive formulations or in building-material formulations. They include, for example, film-forming assistants for lowering the minimum film formation temperature (MFT reducers), plasticizers, buffers, pH modifiers, dispersants, defoamers, fillers, dyes, pigments, silane coupling agents, thickeners, viscosity regulators, solvents, crosslinking agents and/or preservatives.

The polyvinyl ester dispersions of the invention can be used in the fields of application that are typical therefor.

The dispersions can be used as they are or in the form of water-redispersible dispersion powders. For improved redispersion it is also possible for protective colloids as well, such as polyvinyl alcohol and/or cellulose ethers, for example, and also anticaking agents to be added. These powders may be obtained in a conventional way by spraying of the dispersions.

Examples of fields for use of the dispersions or dispersion powders of the invention include their use in paints, adhesives, textiles, more particularly in nonwovens, and also in construction products.

The dispersions or dispersion powders of the invention can be used, for example, in construction products, in conjunction with hydraulically setting binders, cements, examples being Portland, aluminate, trass, slag, magnesia, and/or phosphate cement, gypsum and waterglass, for producing construction adhesives, especially tile adhesives and adhesives for integrated thermal insulation systems, renders, trowelling compounds, flooring compounds, leveling compounds, grouts, jointing mortars, and paints.

Furthermore, the polymer dispersions of the invention are used with preference as an adhesive for any desired substrates, preferably for the adhesive bonding of porous and semiporous substrates. Bonds of this kind include, for example, bonds of paper, card, corrugated cardboard, foam material, cement, leather, textiles or pressed laminates, where appropriate in combination with nonporous substrates, polymeric films. Examples of preferred adhesive bonds are paper/paper or paper/polymeric film combinations. Further preferred adhesive bonds are polymeric film/polymeric film combinations.

Other applications lie in adhesives for the construction sector, as floor, wall or ceiling adhesive, or as furniture-foil adhesives or carpet-backing adhesives.

Additionally the polymer dispersions of the invention are used preferably as binders for any desired substrates, such as, for example, as binders for wood fiber board or artificial leather, and also binders for insulating materials made from paper fiber or polymeric fiber, as binders for textiles and nonwovens (engineered fabrics), and also in textile printing and as a textile finish.

With very particular preference, however, the dispersions of the invention are used as binders for emulsion paints for the interior and/or exterior sectors.

These applications are likewise provided by the present invention.

The examples which follow serve to illustrate the invention, without imposing any limitation thereon. The parts and percentages given in the examples are by weight, unless noted otherwise.

Measuring Methods

Measuring the Particle Size Distribution

The particle size distribution measurement was carried out using the Mastersizer Micro Plus laser diffraction instrument from Malvern. The scatter data were evaluated using the volume-averaged "polydisperse Mie" evaluation provided by Malvern, with $d_w$ as average diameter.

Glass Transition Temperature

The glass transition temperature measurement was carried out using a Mettler DSC 820 at 10 K/min. The second heating curve was the curve evaluated.

Measuring the K Value

The "K value" is a relative viscosity number determined in analogy to DIN 53726. This K value goes back to a formula by FIKENTSCHER which for certain polymer solutions establishes a correlation between the relative viscosity and the concentration of the polymer in the solution (in g/100 ml of solution) (H. Fikentscher, Cellulosechemie 1932, 13, p. 58). Measurement took place at 23° C. in DMF as solvent. The K value correlates with the molecular weight of the polymer.

Measuring the Pigment Compatibility

The method is used to test the pigment stability of dispersions, which is important particularly for the production of renders. For the test, 33 g of dispersion (50% form) were premixed in a stirring beaker directly with 44 g of calcium carbonate (d50%=23 µm) and 22 g of calcium carbonate (d50%=5 µm), and this preliminary mixture was then stirred for a period of one minute using a low-performance dissolver, at a speed of 1000 $min^{-1}$, until a smooth and homogeneous mixture was obtained.

The speed of the dissolver was increased to 3000 $min^{-1}$ and a measurement was made of the time taken for the viscosity of the mixture to reach a point at which sufficient mixing no longer took place. The test was generally terminated after 10 minutes, with pigment-stable dispersions still exhibiting no damage or viscosity increase at all after this time.

Measuring the Abrasion Resistance

The wet abrasion resistance test took place in accordance with the standard DIN EN ISO 11998. The coating under test was drawn down onto a sample film using a film coater of appropriate slot width, and, after the predetermined drying time, was weighed and subjected to 200 abrasion cycles in an abrasion tester. The sample film was then washed, dried, and weighed again. A determination was made of the loss in mass, which was used to calculate the average loss of layer thickness. In accordance with the loss of layer thickness, the paints were classified into wet abrasion classes (1 to 5) within the standard DIN EN 13300.

For the implementation of the measurement, the paint was thoroughly mixed and was knife-coated onto a Leneta chart in a wet film thickness of 300 µm, and dried under standard conditions (23° C./50% relative humidity). Following storage, the coated film was weighed and subjected to the abrasion test. For this purpose the film was clamped into an abrasion tester (e.g., Erichsen model 494) and abraded with the nonwoven abrasive pad for 200 cycles. The abrasive pad material used was the Scotch Brite Br. 7448, type S, UFN grade.

The film was washed gently with water in order to remove abraded residues of paint, and then was dried to constant weight under standard conditions. With the aid of the dry film density of the paint it was possible to calculate the loss of layer thickness in μm.

Measuring the Hiding Power/contrast Ratio for White or Light-colored Coating Systems The hiding power was tested in accordance with standard DIN EN ISO 6504-3. For the determination of the contrast ratio, black/white charts were coated and the colorimetric values over the white and black areas were measured. The contrast ratio was calculated as the ratio of the colorimetric values on the white and black areas of each chart. The paints were classified into contrast classes (1 to 4) with the associated covering power in $m^2/l$, within the standard DIN EN 13300.

For the implementation of the measurement, the paint was mixed thoroughly and drawn down in a wet film thickness of 150 μm, 200 μm and 250 μm onto black/white charts (e.g., Leneta), and dried for 24 h under standard conditions (23° C./50% relative humidity).

The calorimetric values of the individual films over the white and black areas were determined, and used for determining the associated contrast ratio. From the color density determined and from the solids content it was possible to calculate the associated covering power. For the determination it was also possible to employ the VdL Guideline VdL-RL 09.

Water Absorption in the Film

A circular film with a thickness of approximately 1 mm and a diameter of 6.5 cm was produced from the dispersion. It was dried under vacuum at a temperature of 40° C. for 24 hours. The film is weighed, then stored in water for 24 h, and weighed again.

The water absorption in percent can be calculated from the difference in weight.

EXAMPLE 1

Inventive

A 30 l pressure apparatus with stirrer, jacket heating, and metering pumps was charged with an aqueous solution composed of the following constituents:

Initial Charge

| 9661 g | DI water (deionized water) |
| 543 g | Celvol ® 504 (15% strength in DI water, polyvinyl alcohol from Celanese) |
| 543 g | Emulsogen ® EPN 287 (70% strength in DI water, nonionic emulsifier based on an ethoxylate, from Clariant) |
| 423 g | Texapon K12/15 ® (15% strength in DI water, ionic, sulfate-containing emulsifier from Cognis) |
| 217 g | sodium ethenesulfonate (30% strength in DI water) |
| 32.5 g | sodium acetate |
| 5.1 g | sodium disulfite |
| 0.03 g | Mohr's salt |

Monomer Mixture

| 256 g | glycidyl methacrylate |
| 11230 g | vinyl acetate |

Ethylene Quantity

| 1575 g | ethylene |

The polyvinyl alcohol was dissolved beforehand in a 15% strength solution at 90° C. for 2 hours.

The apparatus was freed from atmospheric oxygen. 20% of the monomer mixture (total amount: 11230 g) was metered into the reactor over the course of 10 minutes.

The ethylene valve was opened at room temperature and ethylene was injected to a pressure of 15 bar. The reactor was heated to an internal temperature of 65° C. When 35° C. had been reached, initiator 1 (28.6 g of sodium peroxodisulfate in 227 g of DI water) was added over the course of approximately 8 minutes. When 65° C. had been reached, the ethylene valve was opened (approximately 60 bar) and the remaining 80% of the monomer mixture was metered in over the course of approximately 45 minutes, at a rate that allowed an internal temperature of approximately 110° C. to be maintained. The cooling had to be set accordingly (in this case at 95° C.). As soon as the internal temperature began to drop, the metered addition of initiator 2 (16.1 g of sodium peroxodisulfate in 227 g of DI water) was commenced (about 7 minutes after the beginning of the monomer feed). When the monomer feed was at an end, the metering of initiator 2 continued for about 30 minutes. Heating was continued for about an hour thereafter at 85° C. in order to lower the residual monomer content.

Characteristic Data of Example Dispersion 1

| Solids content: | 54% |
| pH (electrode measurement): | 5 |
| Brookfield viscosity (23° C., spindle 4, 20 rpm): | 5100 mPas |
| Residual monomer content: | <0.2% |
| Polymer glass transition temperature (20 K/min): | 15° C. |
| Particle size distribution (PCS, 90°): | $d_w$ = 220 nm |
| | $d_w/d_n$ = 1.05 |

EXAMPLE 2

Inventive, Less Emulsifier

The procedure was as for Example 1, but with the following constituents:

Initial Charge

| 9661 g | DI water (deionized water) |
| 543 g | Celvol ® 504 (15% strength in DI water, polyvinyl alcohol from Celanese) |
| 370 g | Emulsogen ® EPN 287 (70% strength in DI water, nonionic emulsifier based on an ethoxylate, from Clariant) |
| 423 g | Texapon K12/15 ® (15% strength in DI water, ionic, sulfate-containing emulsifier from Cognis) |
| 217 g | sodium ethenesulfonate (30% strength in DI water) |
| 32.5 g | sodium acetate |
| 5.1 g | sodium disulfite |
| 0.03 g | Mohr's salt |

Monomer Mixture

| | |
|---|---|
| 256 g | glycidyl methacrylate |
| 11230 g | vinyl acetate |

Ethylene Quantity

| | |
|---|---|
| 1575 g | ethylene |

Characteristic Data of Example Dispersion 2

| | |
|---|---|
| Solids content: | 53% |
| pH (electrode measurement): | 4 |
| Brookfield viscosity (23° C., spindle 4, 20 rpm): | 5600 mPas |
| Residual monomer content: | <0.2% |
| Polymer glass transition temperature (20 K/min): | 16° C. |
| Particle size distribution (PCS, 90°): | $d_w$ = 205 nm |
| | $d_w/d_n$ = 1.05 |

EXAMPLE 3

Inventive

Without PVOH

The procedure was as for Example 1, but with the following constituents:
Initial Charge

| | |
|---|---|
| 9661 g | DI water (deionized water) |
| 543 g | Emulsogen ® EPN 287 (70% strength in DI water, nonionic emulsifier based on an ethoxylate, from Clariant) |
| 423 g | Texapon K12/15 ® (15% strength in DI water, ionic, sulfate-containing emulsifier from Cognis) |
| 217 g | sodium ethenesulfonate (30% strength in DI water) |
| 32.5 g | sodium acetate |
| 5.1 g | sodium disulfite |
| 0.03 g | Mohr's salt |

Monomer Mixture

| | |
|---|---|
| 256 g | glycidyl methacrylate |
| 11230 g | vinyl acetate |

Ethylene Quantity

| | |
|---|---|
| 1575 g | ethylene |

Characteristic Data of Example Dispersion 3

| | |
|---|---|
| Solids content: | 54% |
| pH (electrode measurement): | 4 |
| Brookfield viscosity (23° C., spindle 4, 20 rpm): | 1100 mPas |
| Residual monomer content: | <0.2% |
| Polymer glass transition temperature (20 K/min): | 11° C. |
| Particle size distribution (PCS, 90°): | $d_w$ = 282 nm |
| | $d_w/d_n$ = 1.02 |

EXAMPLE 4

Inventive 1 pbw PVOH

The procedure was as for Example 1, but with the following constituents:
Initial Charge

| | |
|---|---|
| 9661 g | DI water (deionized water) |
| 854 g | Celvol ® 504 (15% strength in DI water, polyvinyl alcohol from Celanese) |
| 543 g | Emulsogen ® EPN 287 (70% strength in DI water, nonionic emulsifier based on an ethoxylate, from Clariant) |
| 423 g | Texapon K12/15 ® (15% strength in DI water, ionic, sulfate-containing emulsifier from Cognis) |
| 217 g | sodium ethenesulfonate (30% strength in DI water) |
| 32.5 g | sodium acetate |
| 5.1 g | sodium disulfite |
| 0.03 g | Mohr's salt |

Monomer Mixture

| | |
|---|---|
| 256 g | glycidyl methacrylate |
| 11230 g | vinyl acetate |

Ethylene Quantity

| | |
|---|---|
| 1575 g | ethylene |

Characteristic Data of Example Dispersion 4

| | |
|---|---|
| Solids content: | 53% |
| pH (electrode measurement): | 4 |
| Brookfield viscosity (23° C., spindle 4, 20 rpm): | 5300 mPas |
| Residual monomer content: | <0.2% |
| Polymer glass transition temperature (20 K/min): | 12° C. |
| Particle size distribution (PCS, 90°): | $d_w$ = 211 nm |
| | $d_w/d_n$ = 1.05 |

EXAMPLE 5

Inventive

Silane

The procedure was as for Example 1, but with the following constituents:
Initial Charge

| | |
|---|---|
| 9661 g | DI water (deionized water) |
| 543 g | Celvol ® 504 (15% strength in DI water, polyvinyl alcohol from Celanese) |

-continued

| | |
|---|---|
| 543 g | Emulsogen ® EPN 287 (70% strength in DI water, nonionic emulsifier based on an ethoxylate, from Clariant) |
| 423 g | Texapon K12/15 ® (15% strength in DI water, ionic, sulfate-containing emulsifier from Cognis) |
| 217 g | sodium ethenesulfonate (30% strength in DI water) |
| 32.5 g | sodium acetate |
| 5.1 g | sodium disulfite |
| 0.03 g | Mohr's salt |

Monomer Mixture

| | |
|---|---|
| 51.6 g | silane A 171 |
| 11230 g | vinyl acetate |

Ethylene Quantity

| | |
|---|---|
| 1575 g | ethylene |

Characteristic Data of Example Dispersion 5

| | |
|---|---|
| Solids content: | 53% |
| pH (electrode measurement): | 5 |
| Brookfield viscosity (23° C., spindle 4, 20 rpm): | 4400 mPas |
| Residual monomer content: | <0.2% |
| Polymer glass transition temperature (20 K/min): | 16° C. |
| Particle size distribution (PCS, 90°): | $d_w$ = 309 nm |
| | $d_w/d_n$ = 1.6 |

EXAMPLE 6

Inventive

100° C., 90 min Monomer Feed

The procedure of Example 1 was repeated, but with the following constituents and with a polymerization temperature of 100° C., and with a monomer feed time of 90 min rather than 45 min.

Initial Charge

| | |
|---|---|
| 9661 g | DI water (deionized water) |
| 543 g | Celvol ® 504 (15% strength in DI water, polyvinyl alcohol from Celanese) |
| 543 g | Emulsogen ® EPN 287 (70% strength in DI water, nonionic emulsifier based on an ethoxylate, from Clariant) |
| 423 g | Texapon K12/15 ® (15% strength in DI water, ionic, sulfate-containing emulsifier from Cognis) |
| 217 g | sodium ethenesulfonate (30% strength in DI water) |
| 32.5 g | sodium acetate |
| 5.1 g | sodium disulfite |
| 0.03 g | Mohr's salt |

Monomer Mixture

| | |
|---|---|
| 256 g | glycidyl methacrylate |
| 11230 g | vinyl acetate |

Ethylene Quantity

| | |
|---|---|
| 1575 g | ethylene |

Characteristic Data of Example Dispersion 6

| | |
|---|---|
| Solids content: | 55% |
| pH (electrode measurement): | 4.5 |
| Brookfield viscosity (23° C., spindle 4, 20 rpm): | 4200 mPas |
| Residual monomer content: | <0.2% |
| Polymer glass transition temperature (20 K/min): | 13° C. |
| Particle size distribution (PCS, 90°): | $d_w$ = 207 nm |
| | $d_w/d_n$ = 1.06 |

EXAMPLE 7

Inventive

With Ethylene Pressure Stage

The procedure of Example 1 was repeated, but with the following constituents and with a pressure stage. At the beginning only 5 bar of ethylene were injected. The ethylene pressure was then increased to 60 bar only after a monomer feed time of 25 minutes, and continued until the entire ethylene quantity had been polymerized.

Initial Charge

| | |
|---|---|
| 9661 g | DI water (deionized water) |
| 543 g | Celvol ® 504 (15% strength in DI water, polyvinyl alcohol from Celanese) |
| 543 g | Emulsogen ® EPN 287 (70% strength in DI water, nonionic emulsifier based on an ethoxylate, from Clariant) |
| 423 g | Texapon K12/15 ® (15% strength in DI water, ionic, sulfate-containing emulsifier from Cognis) |
| 217 g | sodium ethenesulfonate (30% strength in DI water) |
| 32.5 g | sodium acetate |
| 5.1 g | sodium disulfite |
| 0.03 g | Mohr's salt |

Monomer Mixture

| | |
|---|---|
| 256 g | glycidyl methacrylate |
| 11230 g | vinyl acetate |

Ethylene Quantity

| | |
|---|---|
| 1575 g | ethylene |

Characteristic Data of Example Dispersion 7

| | |
|---|---|
| Solids content: | 54% |
| pH (electrode measurement): | 4.5 |
| Brookfield viscosity (23° C., spindle 4, 20 rpm): | 3200 mPas |
| Residual monomer content: | <0.2% |
| Polymer glass transition temperature (20 K/min): | 13° C. |
| Particle size distribution (PCS, 90°): | $d_w$ = 220 nm |
| | $d_w/d_n$ = 1.02 |

EXAMPLE 8

Comparative

Low Temperature

A 30 l pressure apparatus with stirrer, jacket heating, and metering pumps was charged with an aqueous solution composed of the following constituents:

Initial Charge

| | |
|---|---|
| 9700 g | DI water (deionized water) |
| 545 g | Celvol ® 504 (15% strength in DI water, polyvinyl alcohol from Celanese) |
| 545 g | Emulsogen ® EPN 287 (70% strength in DI water, nonionic emulsifier based on an ethoxylate, from Clariant) |
| 425 g | Texapon K12/15 ® (15% strength in DI water, ionic, sulfate-containing emulsifier from Cognis) |
| 218 g | sodium ethenesulfonate (30% strength in DI water) |
| 32.7 g | sodium acetate |
| 5.1 g | sodium disulfite |
| 0.03 g | Mohr's salt |

Monomer Mixture

| | |
|---|---|
| 260 g | glycidyl methacrylate |
| 11275 g | vinyl acetate |

Ethylene Quantity

| | |
|---|---|
| 1581 g | ethylene |

The polyvinyl alcohol was dissolved beforehand in a 15% strength solution at 90° C. for 2 hours.

The apparatus was freed from atmospheric oxygen. 5% of the monomer mixture (total amount: 13116 g) was metered into the reactor over the course of 5 minutes. The ethylene valve was opened at room temperature and ethylene was injected to a pressure of 15 bar. The reactor was heated to an internal temperature of 65° C. When 35° C. had been reached, the first portion of the initiator (28.6 g of sodium peroxodisulfate in 227 g of DI water) was added over the course of approximately 8 minutes. When 65° C. had been reached, the ethylene valve was opened (approximately 35 bar) and the remaining 95% of the monomer mixture was metered in over the course of 3 hours 30 minutes. 30 minutes before the end of monomer, the second portion of the initiator (13.6 g of sodium peroxodisulfate in 227 g of DI water) was metered in over 30 minutes. When the monomer feed was at an end, the batch was heated to 85° C. over the course of 30 minutes, and heating was continued at 85° C. for an hour in order to lower the residual monomer content.

Characteristic Data of Example Dispersion 8

| | |
|---|---|
| Solids content: | 52% |
| pH (electrode measurement): | 4.7 |
| Brookfield viscosity (23° C., spindle 4, 20 rpm): | 1500 mPas |
| Residual monomer content: | <0.2% |
| Polymer glass transition temperature (20 K/min): | 13° C. |
| Particle size distribution (PCS, 90°): | $d_w$ = 150 nm |
| | $d_w/d_n$ = 1.02 |

EXAMPLE 9

Molecular Weights

The molecular weights of the polymer dispersions, via the Fikentscher value (K value) of the inventive dispersions (Examples 1-7), are at a level comparable with that of the comparative example (Example 8); compare Table 1.

TABLE 1

Properties of the examples

| | K value of the polymer | Abrasion resistance in a paint | Hiding power in a paint with a coverage of 8 m$^2$/l (class II) | Pigment compatibility in a paint |
|---|---|---|---|---|
| Example 1 (inventive) | 74.4 | 21 μm | >98% | >10 min |
| Example 2 (inventive) | 70.4 | 21 μm | >98% | <10 min |
| Example 3 (inventive) | 75.3 | 18 μm | >98% | >10 min |
| Example 4 (inventive) | 70.5 | 15 μm | >98% | >10 min |
| Example 5 (inventive) | 74.0 | 32 μm | >98% | >10 min |
| Example 6 (inventive) | 76.4 | 25 μm | >98% | >10 min |
| Example 7 (inventive) | 77.9 | 20 μm | >98% | >10 min |
| Example 8 (comparative) | 78.3 | 20 μm | >98% | >10 min |

EXAMPLE 10

Application in a Paint Formula

The abrasion resistance of a paint produced using the inventive dispersions from Examples 1-7 is at a level comparable with that of the paint produced with the comparative dispersion (from Example 8); compare Table 1.

The hiding power of a paint produced using the inventive dispersions from Examples 1-7 is at a level comparable with that of the paint produced with the comparative dispersion (from Example 8); compare Table 1.

The pigment compatibility of a paint produced using the inventive dispersions from Examples 1-7 is at a level comparable with that of the paint produced with the comparative dispersion (from Example 8); compare Table 1.

Hence it is shown that the most important properties in paint application produced with the inventive dispersions from Examples 1-7 are comparable with those of a paint produced with the comparative dispersion.

EXAMPLE 11

Water Absorption in the Film

The water absorption in films produced from the dispersions is significantly lower in the case of the inventively produced dispersions, a fact which goes hand in hand with a lower water sensitivity and hence is more advantageous in application (for results see Table 2).

TABLE 2

| Properties of the examples | |
|---|---|
| | Water absorption in the film [%] |
| Example 1 (inventive) | 16 |
| Example 8 (comparative) | 20 |

EXAMPLE 12

Properties of the Dispersions for Use as Primers

Film on a Fiber Cement Board

A film comprising the dispersion was applied with a wet film thickness of 120 μm to a fiber cement board (Eterboard from Rocholl) and dried at 23° C. for 24 hours. Thereafter the film was assessed (cf. Table 3).

Stability in the Diluted State

The dispersion was diluted until it had a solids content of 13%. The storage stability (sedimentation) of this dispersion was assessed in 100 ml (cf. Table 3).

TABLE 3

| Properties according to Example 12 | | |
|---|---|---|
| | Example 1 (inventive) | Example 8 (comparative) |
| Film on fiber cement board | | |
| Film surface | glossy | glossy |
| Film hardness | soft | soft |
| Film tack | none | none |
| Storage stability in the diluted state | | |
| After 4 weeks | OK | OK |

In comparison to the comparative dispersion, the inventive dispersion showed the same film properties and storage stabilities and is therefore suitable for primer applications.

The invention claimed is:

1. A process of emulsion polymerization of free-radically polymerizable ethylenically unsaturated monomers selected from the group of monoesters or diesters of ethylenically unsaturated monocarboxylic or dicarboxylic acids with alkanols, vinyl esters and/or vinylaromatics and, optionally, further monomers copolymerizable therewith, at least 60% of total conversion in the emulsion polymerization taking place at a temperature of 100° C. to 160° C., which comprises performing the emulsion polymerization in the presence of emulsifiers and optionally in the presence of protective colloids, the protective colloids being present in an amount of from 0% to 0.8% by weight, based on a total amount of the monomers used, and wherein a water-soluble initiator is used without the use of an oil soluble initiator, and wherein the process comprises a metering process in which 5% to 50% by weight of the monomers, based on the total amount of monomers, is included in the initial charge.

2. The process as claimed in claim 1, wherein the duration of polymerization is less than 1.5 hours.

3. The process as claimed in claim 1, wherein the emulsion polymerization is performed at least partly under pressure.

4. The process as claimed in claim 3, wherein at least one gaseous monomer is used which is added under pressure and wherein the gaseous monomer is added only after 10%-50% by weight of the total amount of monomers have undergone conversion.

5. The process as claimed in claim 3, wherein at least one gaseous monomer is used which is added under pressure and wherein the gaseous monomer is added at the beginning of the emulsion polymerization.

6. The process as claimed in claim 1, wherein the ethylenically unsaturated monomers comprise esters of ethylenically unsaturated monocarboxylic or dicarboxylic acids, optionally in combination with one or more ethylenically unsaturated monomers copolymerizable therewith.

7. The process as claimed in claim 1, wherein the ethylenically unsaturated monomers comprise vinyl esters, optionally in combination with one or more ethylenically unsaturated monomers copolymerizable therewith.

8. The process as claimed in claim 7, wherein the polymerization is performed under pressure and wherein monomers used are vinyl acetate and ethylene and, optionally, further monomers copolymerizable therewith, the copolymerization taking place in the presence of nonionic emulsifiers, optionally in combination with polyvinyl alcohol, or in the presence of nonionic and anionic emulsifiers, optionally in combination with polyvinyl alcohol.

9. The process as claimed in claim 2, wherein the duration of polymerization phase is less than 1 hour.

10. The process as claimed in claim 3, wherein the emulsion polymerization is performed at least partly at a pressure of from 10 to 80 bar.

11. The process as claimed in claim 6, wherein the esters of ethylenically unsaturated monocarboxylic or dicarboxylic acids comprise esters of $\alpha,\beta$-ethylenically unsaturated $C_3$-$C_8$ monocarboxylic or dicarboxylic acids.

12. The process as claimed in claim 11, wherein the esters of $\alpha,\beta$-ethylenically unsaturated $C_3$-$C_8$ monocarboxylic or dicarboxylic acids comprise esters of acrylic acid, esters of methacrylic acid, or combinations thereof.

13. The process as claimed in claim 7, wherein the monomers used in polymerization are selected from the group consisting of vinyl acetate homopolymers, copolymers of vinyl acetate with one or more other vinyl esters, copolymers of vinyl acetate with one or more other vinyl esters and with one or more acrylic esters and/or methacrylic esters, copolymers of vinyl acetate with ethylene, copolymers of vinyl acetate with ethylene and with one or more other vinyl esters, copolymers of vinyl acetate with ethylene and with one or more acrylic esters and/or methacrylic esters, copolymers of vinyl acetate with ethylene and with one or more ethylenically unsaturated epoxide compounds, copolymers of vinyl acetate with ethylene and with one or more ethylenically unsaturated silanes, copolymers of vinyl acetate with ethylene and with one or more ethylenically unsaturated epoxide compounds and with one or more ethylenically unsaturated silanes, and copolymers of vinyl acetate with ethylene and with vinyl chloride.

14. The process as claimed in claim 8, wherein further monomers copolymerizable with vinyl acetate and ethylene are utilized, the further monomers selected from the group consisting of acrylic esters, methacrylic esters, other vinyl esters, ethylenically unsaturated epoxide compounds, ethylenically unsaturated silanes, and combinations thereof.

15. A process of emulsion polymerization of free-radically polymerizable ethylenically unsaturated monomers selected from the group of monoesters or diesters of ethylenically unsaturated monocarboxylic or dicarboxylic acids with alkanols, vinyl esters and/or vinylaromatics and, optionally, further monomers copolymerizable therewith, at least 60% of total conversion in the emulsion polymerization taking place at a temperature of 100° C. to 160° C., which comprises performing the emulsion polymerization in the presence of emulsifiers and optionally in the presence of protective colloids, the protective colloids being present in an amount of from 0% to 0.8% by weight, based on a total amount of the monomers used, and wherein a water-soluble initiator is used without the use of an oil soluble initiator, and wherein the emulsion polymerization is performed at least partly under pressure and wherein at least one gaseous monomer is used which is added under pressure and wherein the gaseous monomer is added only after 10%-50% by weight of the total amount of monomers have undergone conversion.

16. The process as claimed in claim 15, wherein the duration of the polymerization is less than 1.5 hours.

17. The process as claimed in claim 15, wherein the ethylenically unsaturated monomers comprise esters of ethylenically unsaturated monocarboxylic or dicarboxylic acids, optionally in combination with one or more ethylenically unsaturated monomers copolymerizable therewith.

18. The process as claimed in claim 15, wherein the ethylenically unsaturated monomers comprise vinyl esters, optionally in combination with one or more ethylenically unsaturated monomers copolymerizable therewith.

19. The process as claimed in claim 15, wherein the emulsion polymerization is performed at least partly at a pressure of from 10 to 80 bar.

* * * * *